(12) United States Patent
Even et al.

(10) Patent No.: US 7,170,210 B2
(45) Date of Patent: Jan. 30, 2007

(54) ALTERNATOR EQUIPPED WITH STATOR HAVING TWISTED INPUTS

(75) Inventors: Denis Even, Paris (FR); Pierre Faverolle, Montgeron (FR); Jean-Luc Tarrago, Bonneuil S/Marne (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 10/515,142

(22) PCT Filed: May 23, 2003

(86) PCT No.: PCT/FR03/01563
§ 371 (c)(1),
(2), (4) Date: Jul. 18, 2005

(87) PCT Pub. No.: WO03/100945
PCT Pub. Date: Dec. 4, 2003

(65) Prior Publication Data
US 2006/0001326 A1     Jan. 5, 2006

(30) Foreign Application Priority Data
May 28, 2002     (FR) .................................. 02 06515

(51) Int. Cl.
*H02K 11/00*     (2006.01)
*H02K 3/00*     (2006.01)

(52) U.S. Cl. .................. 310/201; 310/180; 310/184
(58) Field of Classification Search ............. 310/179, 310/180, 184, 201, 208, 260, 270
See application file for complete search history.

(56) References Cited

U.S. PATENT DOCUMENTS

| 5,955,810 A | 9/1999 | Umeda | |
|---|---|---|---|
| 6,201,332 B1 * | 3/2001 | Umeda et al. | 310/184 |
| 6,204,586 B1 * | 3/2001 | Umeda et al. | 310/179 |
| 6,211,594 B1 * | 4/2001 | Umeda et al. | 310/180 |
| 6,373,163 B1 | 4/2002 | Oohashi | |
| 6,624,544 B2 * | 9/2003 | Higashino et al. | 310/201 |

FOREIGN PATENT DOCUMENTS

| EP | 0 881 752 A | 12/1998 |
|---|---|---|
| EP | 1 081 830 A | 3/2001 |
| EP | 1 126 579 A | 8/2001 |

* cited by examiner

*Primary Examiner*—Tran Nguyen
(74) *Attorney, Agent, or Firm*—Osha Liang LLP

(57) ABSTRACT

An alternator having a rotor and a stator is described. The stator includes a cylindrical body with a plurality of phases. Each of the plurality of phases includes a phase input located at least partially outside of the cylindrical body, where the phase input is formed of a bar. The bar includes a longitudinal surface extending along at least a part of the bar, a first segment crossing the cylindrical body, and a second segment extending from an axial side of the cylindrical body. Each of the plurality of phases further includes a phase output located at least partially outside of the cylindrical body and conducting elements crossing the cylindrical body and forming at two axially opposite sides of the body, respectively, a first chignon and a second chignon. The conducting elements are electrically connected to form at least one winding connecting the phase input to the phase output.

18 Claims, 13 Drawing Sheets

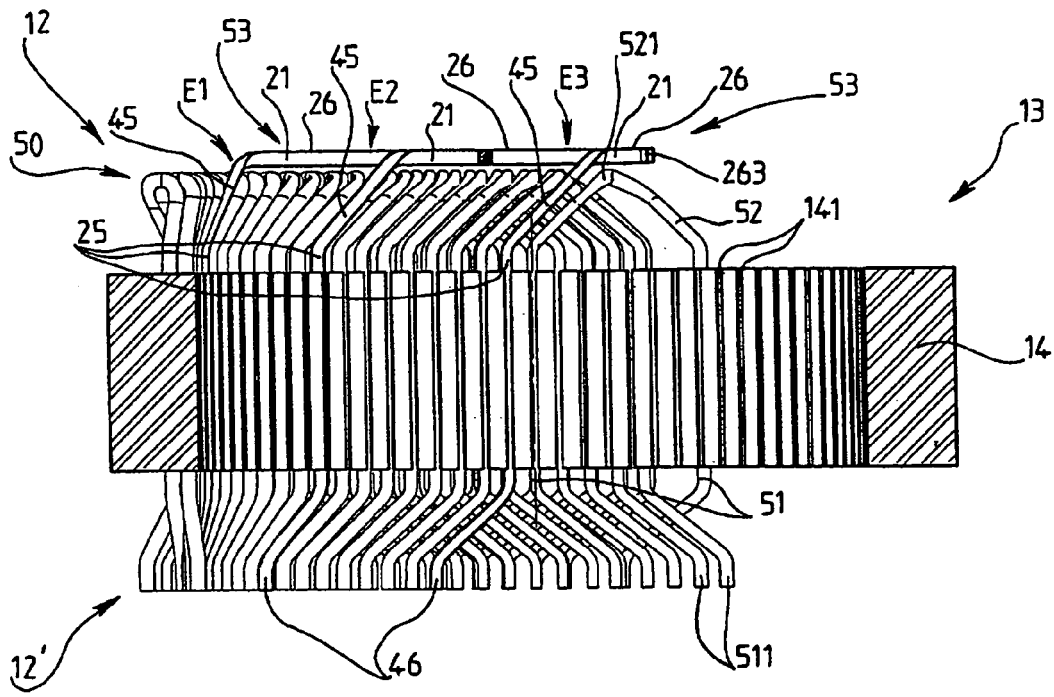
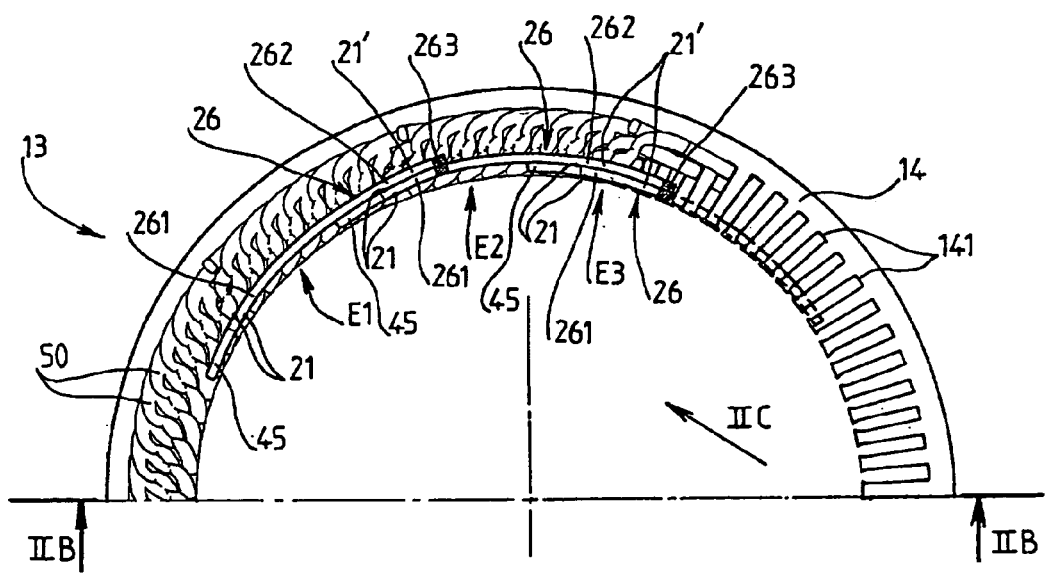

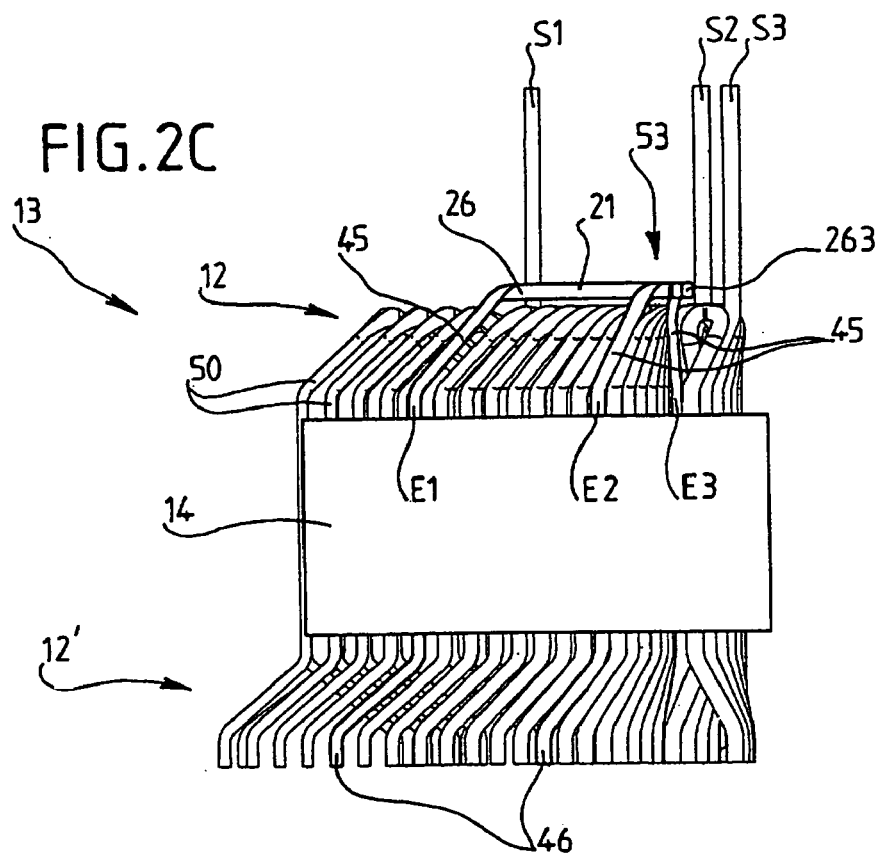
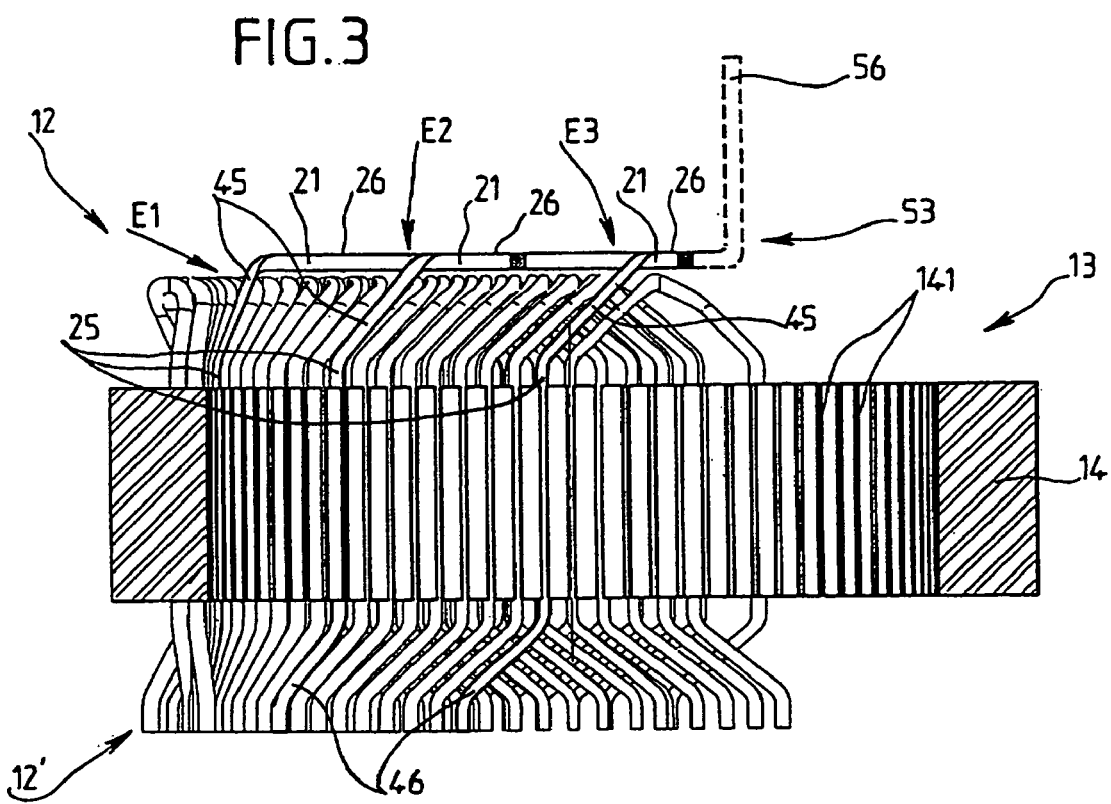

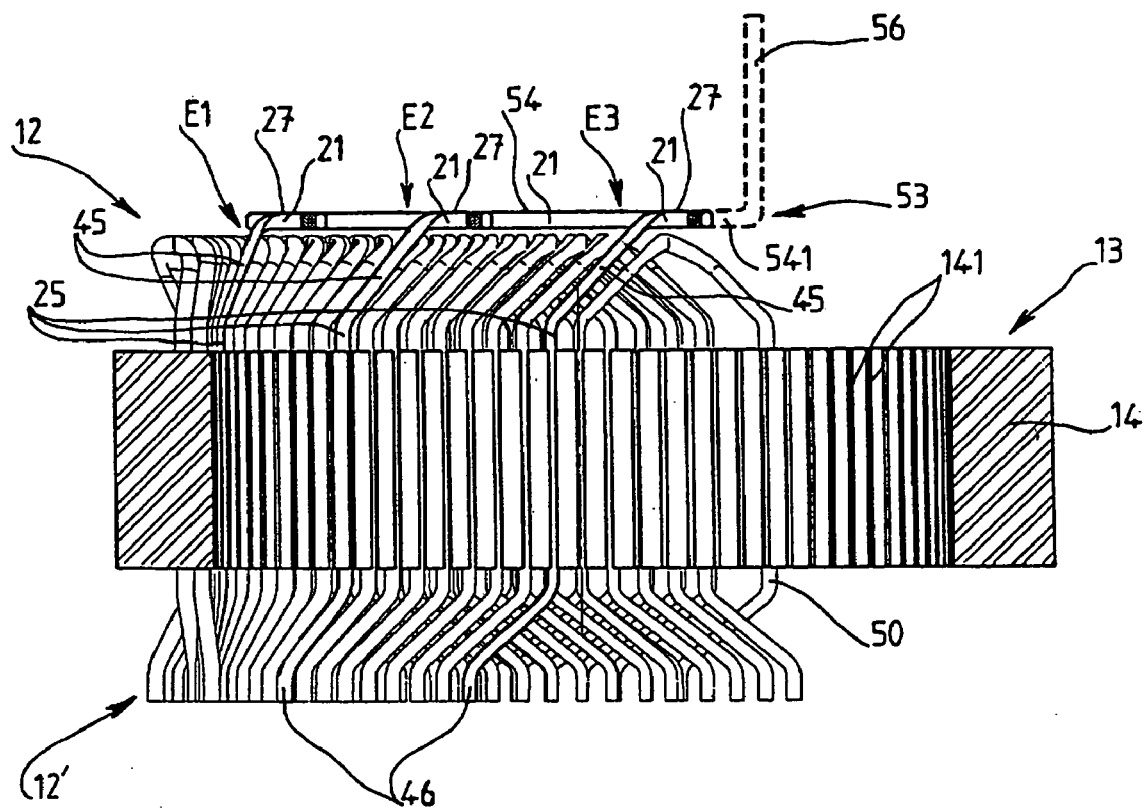
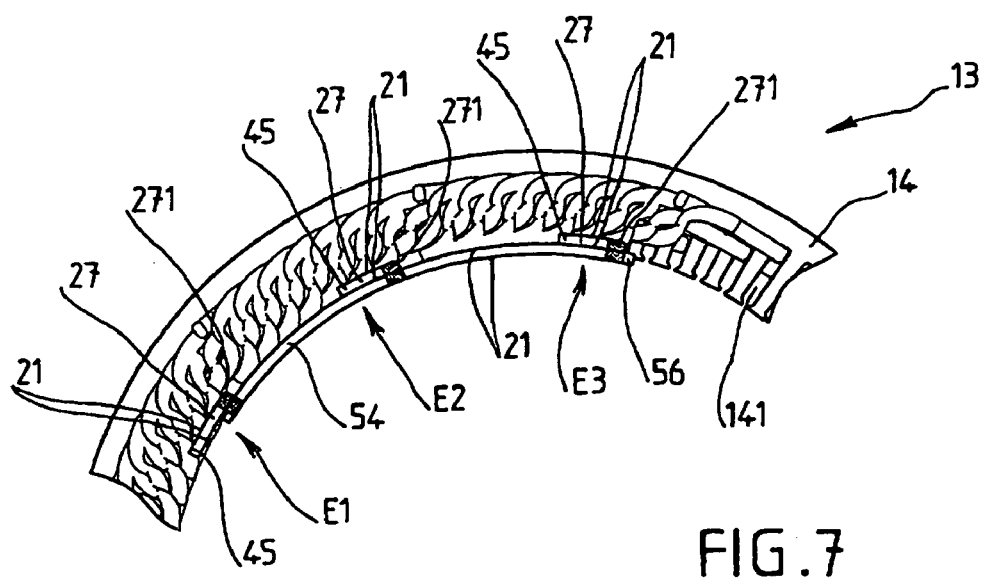

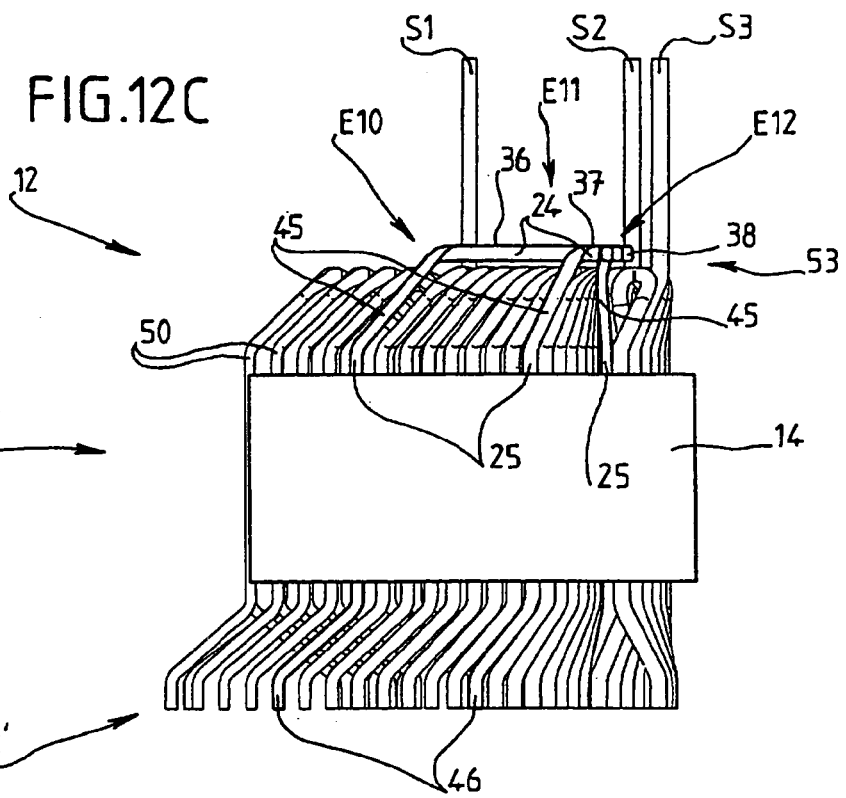

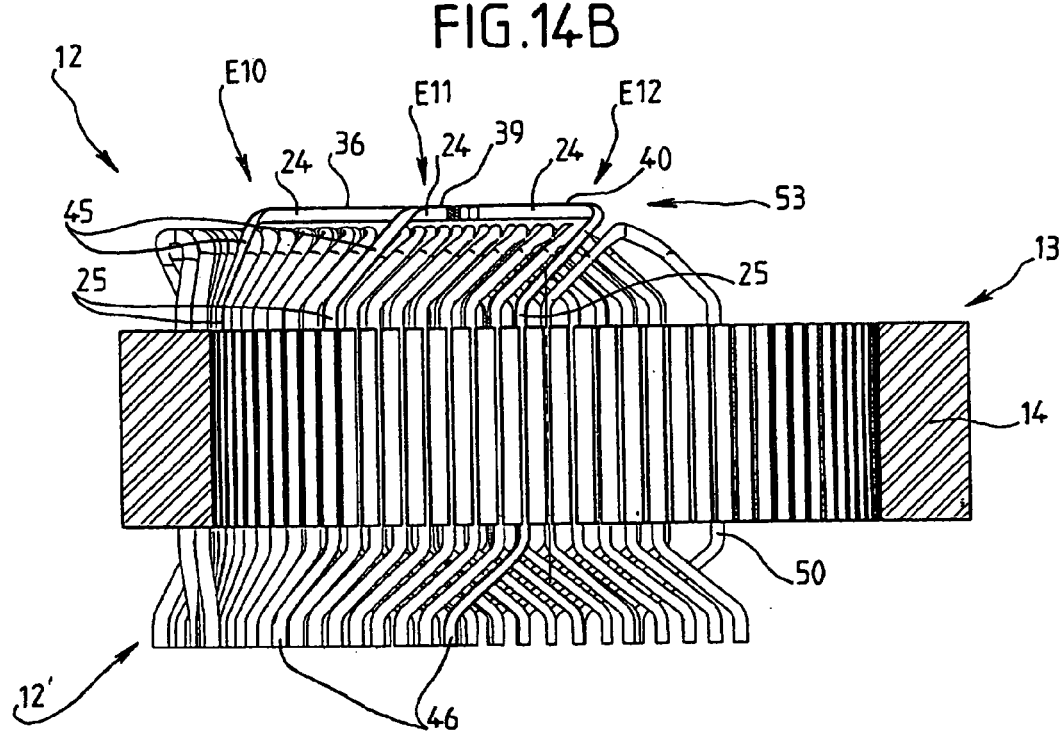
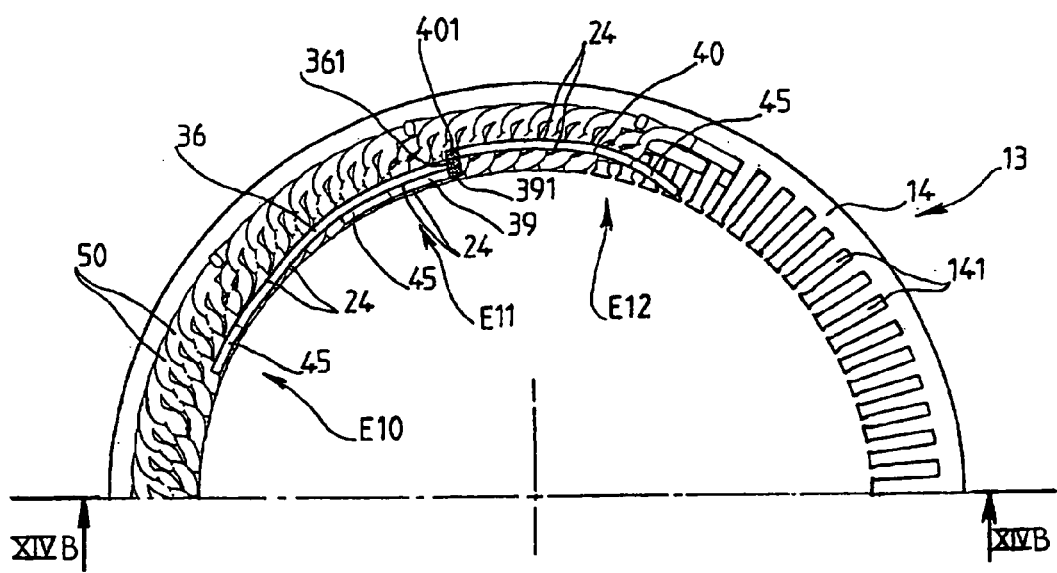

ALTERNATOR EQUIPPED WITH STATOR HAVING TWISTED INPUTS

BACKGROUND OF INVENTION

1. Field of the Invention

The invention concerns alternators in general, including for automobiles.

More specifically, the invention concerns an alternator, particularly for an automobile, that includes a stator equipped with a cylindrical body that has several phases; each phase includes, first, an intake and an outtake located at least in part on the exterior of the stator body and, second, electric conducting elements that cross the body of the stator to form the first and second chignons from the two axial sides opposite the stator; the conducting elements are electrically connected to each other to form at least one winding that connects the phase inputs to the phase outputs, and the inputs are composed of bars that have at least one longitudinal flat surface extending along at least a part of the bar and each input contains a first segment that crosses the body of the stator and a second end segment that extends from the axial side of this body; the second segments of the inputs are located on the same axial side of the stator body and are electrically connected to form a neutral point.

2. Background Art

Devices of this type are known from previous technology, primarily through the French patent application 0116658, which will be published under number FR-A-2 818 822 in the name of VALEO, which shows an alternator, the neutral point of which can be made by arranging the phase inputs in different ways. The inputs are rectangular bars, that present opposite, relatively wide, longitudinal flat surfaces that are called flats and opposing, relatively narrow longitudinal flat surfaces called edges.

The body of the stator includes narrow, radial notches, and the input bars are engaged in these notches so that the flats of the first segments each extend into a significantly radial plane.

The inputs are formed so that their second segments present the form of portions of coaxial cylinders in the body of the rotor. The flats constitute the axial surfaces of these cylinder portions, and the edges are the interior and exterior radial surfaces. Thus, the second segments are obtained by laterally bending the first segments, i.e. on the side of either of the flats.

The inputs are in contact with each other or with the neutral bar through the flats of their second segments. The neutral bar and the second segments of the inputs are thus stacked axially.

This arrangement offers a defect because if it is very difficult to weld the inputs between them or on the neutral bar after bending the electrically conducting elements, because there is not enough space available to introduce the welding head axially.

Patent documents EP 1 143 596 and U.S. Pat. No. 5,998,903 reveal alternators that containing stators the three inputs of which are combined at one neutral point. A first input includes a second axial end segment; the flats of this second segment extend into radial planes. The second segments of the other two inputs have, as in French patent application 01 16658, the form of coaxial cylinder portions in the body of the rotor. The flats constitute the axial surfaces of these cylinder portions, and the edges constitute the interior and exterior radial surfaces. These cylinder portions each extend through an axial part; these axial parts are placed through a flat onto the two flats opposite the second segment of the first input.

This arrangement allows welding the inputs to each other after bending the pins, but presents the defect of increasing the axial size of the chignon carrying the inputs.

SUMMARY OF INVENTION

In this context, the purpose of the present invention is to correct the defects cited above, and to propose several arrangements that allow welding the inputs after bending the pins, without having to systematically use the parts with an axial orientation.

For this purpose, the device in the invention, which also complies with the generic definition given in the introduction above, is essentially characterized by the fact that the inputs are twisted, with the flat surface of each input extending along the first segment in a generally radial plane and extending along the second end segment either to form a coaxial cylinder portion in the body of the stator, or in a plane tangential to a coaxial cylinder in the body of the stator.

Thanks to the twisting of the invention, it is possible to weld the inputs easily and economically after bending the electrical conducting elements, with a chignon with smaller axial dimensions.

To reduce the number of parts, in one possible method of fabricating the invention, the second segments of the inputs are identical.

Advantageously, the second segments of the inputs are electrically connected through a neutral bar with a circumferential orientation; the second segments of the inputs are mounted on this neutral bar through their respective flat surfaces.

Preferably the second segments of the inputs have a circumferential orientation with their respective flat sides forming portions of coaxial cylinders in the body of the stator.

For example, the second segments of the inputs extend along an axial direction, with their respective flat surfaces extending in planes that are tangent to the neutral bar.

Advantageously, a first input includes a second, relatively long segment, with a circumferential orientation, with two other inputs containing second segments of the same length that are relatively shorter than the length of the second segment of the first input; the flat side of the second segment of the first input forms a coaxial cylinder portion in the body of the stator and the second segments of the two other inputs are mounted by their respective flat sides on the flat side of the second segment of the first input.

Preferably, the second segments of the other two inputs are circumferential in orientation and extend in the same direction, clockwise or counter-clockwise, and their respective flat surfaces form coaxial cylinder portions in the body of the stator.

For example, the second segments of the other two inputs are circumferential in orientation and extend in opposite directions—clockwise for one and counter-clockwise for the other—with their respective flat surfaces forming coaxial cylinder portions in the body of the stator.

Advantageously, two inputs are united through their respective second segments to form the two branches of a pin; these respective second segments are circumferential in orientation, with the respective flat surfaces of these two second segments arranged in the extension of each other and form a coaxial cylinder portion in the body of the stator; a third input is attached through the flat side of its second segment to said cylinder portion.

Preferably, the inputs are located at different angle positions around the shaft of the body of the rotor; the two inputs united in a pin are consecutive, following the circumference of the body of the stator.

For example, the inputs are located at different angle positions around the shaft of the body of the rotor; the two inputs united in a pin are not consecutive, following the circumference of the body of the stator.

Advantageously, the second segment of the third input is circumferential in orientation with its flat side forming a coaxial cylinder portion in the body of the stator.

Preferably, the second segment of the third input extends along an axial direction, with the flat surface extending into a plane that is tangent to the second segments united with the two inputs forming a pin.

For example, the second segments of the inputs are circumferential in orientation and all extend in parallel over at least a part of their length.

Advantageously, the second segments of the inputs all extend in the same direction—clockwise or counter-clockwise.

Preferably, the respective second segments of at least two inputs extend in opposite directions, clockwise for one and counter-clockwise for the other.

For example, at least one of the inputs includes an axial segment that extends its second segment in a direction opposite the body of the stator.

Advantageously, the second segments of the inputs are located at an axial end of the first or second chignon.

BRIEF DESCRIPTION OF DRAWINGS

Other properties and advantages of the invention will clearly result from the description given above, which is indicative and not limiting, in reference to the attached figures, which include.

FIG. 2*a* is a top view of a part of the body of a stator from FIG. 1 according to a first method of fabricating the invention; FIG. 2*b* is a section view of half of a stator according to the arrows IIb of FIG. 2*a*; and FIG. 2*c* is a side view according to arrow IIc of FIG. 2*a*.

FIG. 3 is a similar view to FIG. 2*b*, for a variant of the first method for fabricating the invention.

FIG. 5 is a view similar to FIG. 2*b*, for another variant of the first method for fabricating the invention.

FIG. 7 is a partial view similar to FIG. 2*a* for another variant of the first method of making the invention.

FIGS. 12*a*, 12*b* and 12*c* are views similar to views 2*a*, 2*b* and 2*c* for a fourth method of constructing the invention.

FIG. 13 is a view similar to FIG. 12*b* for a variant of the fourth method of constructing the invention.

FIGS. 14*a* and 14*b* are views similar to views 12*a* and 12*b*, for another variant of the fourth method for designing the invention.

In the figures, identical or similar elements will be assigned the same reference signs.

DETAILED DESCRIPTION

Figure 1:
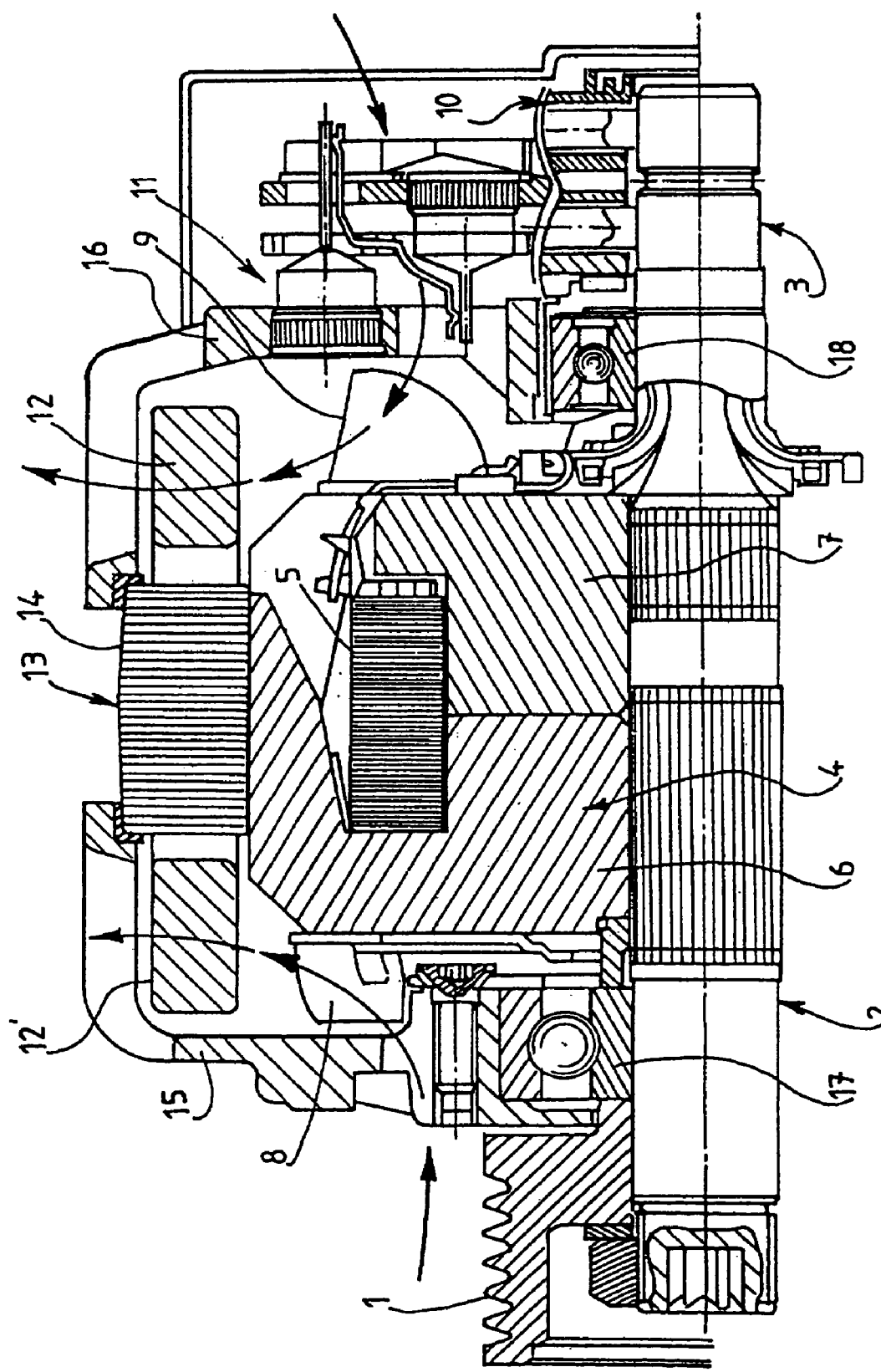
FIG. 1 is an axial half-section view of an alternator according to the invention.

FIG. 1 represents a polyphased turning electrical machine in the form of a compact alternator with internal ventilation of the triphased type for an internal-combustion automobile.

The alternator contains, from left to right in FIG. 1, i.e. from front to back, a drive pulley 1 joined (here, through a nut) to the front end of a shaft 2, the rear end of which holds slip rings (not referenced) that belong to a slip ring assembly 3. The axis of shaft 2 is the axis of rotation of the machine.

In the center, the shaft 2 carries for mounting the rotor 4 equipped with an excitation winding 5, the ends of which are connected through wire links to the slip ring assembly 3. The rotor 4 here is a rotor with fittings and thus contains two front and back polar wheels 6, 7 each carrying a front fan 8 and rear fan 9 for, in a given axial space, an increase in the power of the alternator and a reduction in alternator noise. Each wheel 6, 7 is attached to shaft 2 equipped with sections trimmed for this purpose, as shown in FIG. 1. Each wheel contains a flange perpendicular to the axis of the shaft 2. The excitation winding 5 is located axially between the flanges of the two wheels 6, 7 arranged to form a cylindrical core for mounting the winding 5. On the outside circumference of the flanges are arranged teeth that extend axially. The teeth are trapezoidal in shape and have chamfers on the sides. The teeth of one of the wheels are directed toward the other wheel, angled in relation to the teeth of this other wheel. Thus, the teeth are embedded so that, in one design variant, permanent magnets are intercalated between the two to again increase the power of the machine. For example, profiled grooves are arranged in the lateral edges of the teeth to receive the permanent magnets as described in document FR-A-2 748 248. When the winding 5 is activated, the rotor 4 is magnetized, and thus a pair of magnetic poles is defined, with each polar wheel containing respectively P/2 north poles and P/2 south poles. For more information, refer to document EP-A-0 515 259. The teeth of the polar wheels present laterally, at the level of their roots, to the flange of the polar wheel in question (each one) at least one anti-noise chamfer to again reduce the noise, particularly magnetic noise, of the alternator. Advantageously, each tooth presents, in relation to an axial symmetry axis, two anti-noise chamfers. Thus, the alternator is less noisy.

Fans 8, 9 contain a first series of blades, which create ventilation channels between them. Advantageously, two series of blades of different lengths are provided as described in document FR-A-2 811 156. Thus, at least one blade from the second series of blades is inserted between two longer consecutive blades from the first series of blades. This arrangement reduces the noise of the alternator, while improving its ventilation. The blades come out from a flange, by sectioning and bending, which is mounted (for example, by welding or any other means, such as crimping), on the polar wheel 6, 7 in question. Each wheel has, as described, axial teeth directed toward the other wheel, with embedding of the teeth from one wheel to the next to form magnetic poles when the winding 5 is activated, thanks to the slip rings of the slip ring assembly 3, each in contact with a brush (not referenced) carried by a brush holder 10 also used as a support for a voltage regulator (not visible) connected electrically to the brushes to regulate the voltage of winding 5.

The regulator is connected to a current rectifying device 11, such as a diode axle (two of which are visible in FIG. 1), which is itself connected to the phase outputs equipped with windings, included in the stator 13 of the alternator. The axle here is the type described in document EP-A-0 743 738. Refer to this document for more information. This axle includes a positive heat shunt on which the positive diodes are mounted, a negative heat shunt on which the negative diodes are mounted, and a connector. Here, the negative shunt is formed by the flange of the rear main bearing 16 of the alternator described below. As a variant, the axle is the type described in document FR 01 09 482 filed Jul. 16, 2001. In this case, the positive shunt includes cooling fins, which extend in the radial direction of the alternator; the negative diodes carried by the rear main bearings are cooled by convection and conduction. This type of axle is well adapted to the high-power alternator in the invention. The stator 13, forming an induced circuit, surrounds the rotor 4 and has a body 14 with axial notches inside for the passage of the wires or pins that the windings contain. It is known that the body 14 consists here of a packet of plates, each with notches. These radial, oblong notches constitute grooves when the plates are aligned and lead to the internal circumference of the body 14, and are semi-closed. The body 14 surrounds the rotor 4 with the presence of a radial air gap between the internal circumference of the body 14 and the external circumference of the rotor 4.

The windings are arranged to form chignons 12, 12' which extend, first, out on either side of the body 14 and, second, radially above the fans 8, 9.

These fans 8, 9 extend close to a front main bearing 15 and a rear main bearing 16 respectively. Bearings 15, 16 are metal, and aluminum based. These bearings include, as known, tabs for mounting the alternator on a fixed portion of the automobile and electrical connection of the alternator to the ground. The main bearings 15, 16 are perforated for internal ventilation of the alternator through fans 8, 9 when the assembly of fans 8, 9, rotor 4, shaft 2 is rotated by pulley 1 connected to the automobile engine through a transmission device that includes at least one belt engaged with pulley 1. This ventilation cools the windings of the chignons 12, 12' and the winding 5, as well as the brush-holder 10 with its voltage regulator and the rectifying device 11. We have shown on FIG. 1 with arrows the path followed by the cooling fluid, in this case air, through the various openings of main bearings 15, 16 and within the machine. Each bearing has a sunken shape and has a flange (here with a transversal orientation) presenting air intake openings and, at the outside circumference of the flange, a axial annular edge with air outlet openings located above chignons 12, 12'.

This device 11, the brush-holder, as well as a perforated protective cap (not referenced) preferably made of plastic, are mounted through the rear main bearing 16 so that the rear fan 9 is more powerful than front fan 8. As known in the industry, bearings 15, 16 are connected, here using screws or, in a variant, using non-visible rods, to form a crankcase or support intended to be mounted on a fixed part of the vehicle. This support carries the body 14.

Bearings 15, 16 each carry in the center for their flange a ball bearing 17, 18 to support, in rotation, the front and rear ends of shaft 2 crossing the main bearings to carry pulley 1 and the slip rings of the slip ring assembly 3. The air intake openings are delimited by a cylindrical core with an axial orientation that forms a housing for mounting the ball bearing in question.

The blades of fans 8, 9 extend radially above the housings presented by the main bearings 15, 16 for mounting the ball bearings 17 and 18, which are ventilated in this way. In a variant, the alternator is cooled by a cooling liquid such as the cooling water from the internal combustion engine of the automobile; the rear main bearing containing channels as described, for example, in document DE-A-100 19 914 to be consulted for further explanations. The stator in this case is mounted using pads of an elastic material, an elastomer for example, on the crankcase to filter the vibrations and reduce noise. This is also the case in FIG. 1, where the square-section pads are not referenced.

These pads are between the free ends of the outside part in the form of a lip with axial orientation of the main bearings and the axial ends facing the body 14. These pads constitute elastic damping equipment with radial and axial action for mechanical decoupling of the body 14 from the stator in relation to the crankcase formed by main bearings 15, 16. As a variant, the elastic damping means are at the level of the notches 141 between the edges of the notches and the electrically conducting elements, described below, which are mounted in the notches as described in document FR 99 16369 filed on Dec. 23, 1999 and published under number FR-A-2 803 126. In a variant, deformable thermoconducting resin is placed radially between the outside circumference of the body 14 and the internal circumference of one of the main bearings, such as the front bearing, as described in document FR 00 13527 filed on Oct. 6, 2000. In this case, the winding 5 of the rotor 4 can be formed from a conducting element wound and covered with a connection layer, for example of the thermohardening type, as described in document FR-A-2 809 546. The winding 5 releases more heat which is removed by the thermoconducting resin. In a variant, the body 14 is mounted directly on the main bearings.

In a variant, the rotor contains projecting poles as described in document FR 01 00122 filed on Jan. 5, 2001; permanent magnets are inserted in housings made in the packet of plates contained in the rotor. These housings are open to the external circumference of the rotor and closed axially by magnetic parts intended to stop against the magnets.

In FIGS. 2 to 14, the alternator is at least the triphased type, and contains at least three phases with, for each phase, an input E1 to E12 and an output S1 to S3 respectively. The outputs, as known in the industry, are connected to the electric current rectifying device 11 and the phases of the stator 13 produce alternating current when the rotor is excited and is driven in rotation by the engine of the vehicle via pulley 1. For this reason, the alternative current must be rectified to supply direct current to the electric consumers of the vehicle and recharge the battery of the vehicle. The phases are mounted in a star or a Y so that the inputs are connected to a neutral point as known in the industry.

The alternator may also be hexaphased and thus include, in addition to the first series of three phases, a second series of three phases with an input and an output for each phase, These outputs are connected as described above to the rectifier 11, as described in document EP-A-0 743 738 cited above; the connector of device 11 has tabs for mounting outputs belonging to a network of electrically conducting lugs. The mounting of the outputs on the tabs is done, for example, by crimping or welding.

In all cases, the alternator includes a stator 13, which has a cylindrical body 14 with several phases. The body 14 includes the notches 141 that cross it parallel to its axis; these notches 141 end on an interior surface of the body 14 and are regularly distributed along the interior circumference of the body 14.

As specified above, the stator includes at least three phases in the design modes of the invention described here. Each phase includes, first, an input E1 to E12 and one output S1 to S3 located at least in part on the exterior of the body 14 of the stator 13 and, second, of the electrically conducting elements 50 crossing the body 14 of the stator 13 to form, from the two axial sides opposite the stator, the first and second chignons 12 and 12'.

The conducting elements 50 are electrically connected to form at least one winding that connect the phase inputs E1 to E12 to the phase outputs. There is generally one winding per phase.

These electrically conducting elements 50 are pins containing two straight and parallel axial branches 51 and a head 52 in the form of an arch and connected by two opposite ends to the two axial branches 51.

Figure 9:
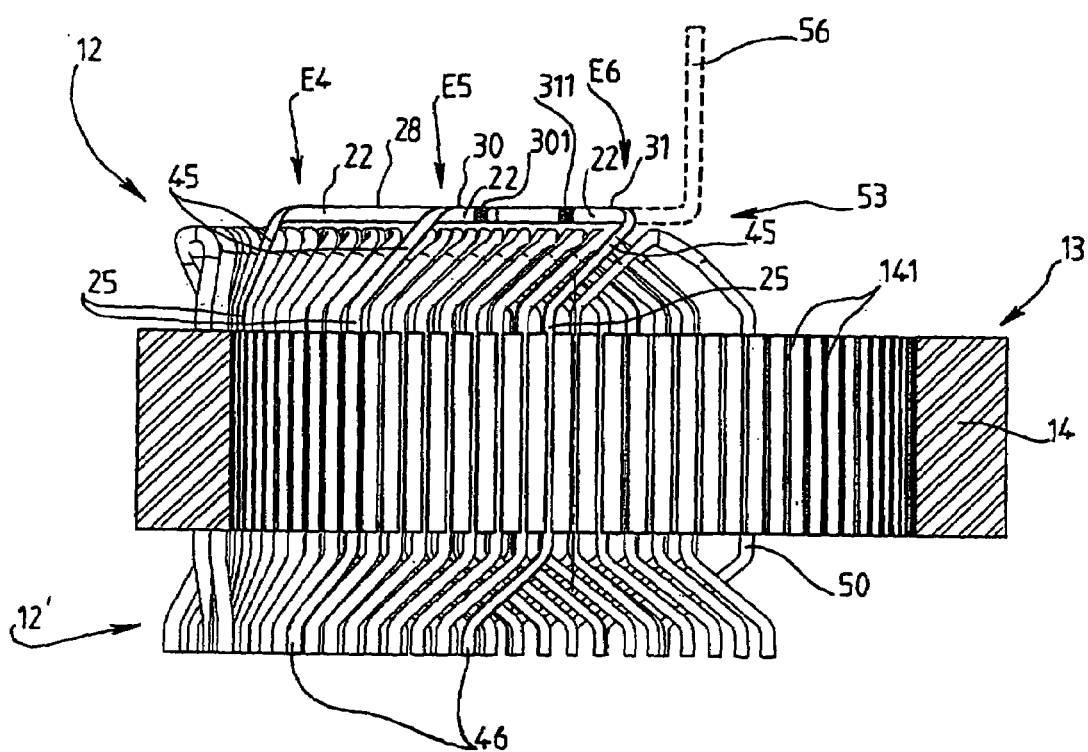
FIG. 9 is a view similar to FIG. 8*b* for a variant of the second method of fabricating the invention.

The axial branches 51 of the same conducting elements are engaged in different notches 141 of the body 14 of the stator 13, with one branch 51 located toward the outside of the body 14 and the other located toward the inside of the body 14. In addition, each axial branch 51 extends from the side opposite the head 52 through a connection part 511 that is welded onto a connection part belonging to the axial branch of another pin 50. Here, the branches 51 are rectangular in shape. Thus, when the alternator is the triphase type, two axial branches 51 are provided per notch 141 as shown in FIG. 5 of Document FR-A-2 818 821. In a variant, as shown in FIG. 9 of Document FR-A-2 818 821, four branches 51 are provided by notch 141, and the phases are mounted in a star or a Y as shown on FIG. 7 of this document. The branches 51 are advantageously mounted with a radial overlay in each notch 141; here it is oblong in shape with a radial orientation.

The arched heads 52 of the pins 50 all project from the same axial side of the body 14 of the stator 13 and form the first chignon 12. They are all parallel to each other and each has in the center an axial top 521 located on the side opposite the body 14. These axial tops 521 make a circle around the axis of the body 14 and form the axial end of the first chignon 12.

The connection parts 511 of the pins 50 project from the axial side of the body 14 of the stator 13 opposite the first chignon 12 and form the second chignon 12'.

Inputs E1 to E12 are formed of bars that have at least one longitudinal flat side 21 to 24 and extend along at least one part of the bar, and generally over the whole bar. Inputs E1 to E12 and outputs S1 to S3 advantageously have the same section as the bars 51 and are, therefore, rectangular here.

More specifically, inputs E1 to E3 are generally rectangular-shaped bars, and thus have two opposite flat sides 12 to 24 that are relatively wide, called flats, and two narrow surfaces 21' to 24', which are flat and opposite, and are called edges, which are relatively narrower than the flat surfaces 21 to 24.

Each input E1 to E12 contains a first segment 25 that crosses the body 14 of the stator 13 and a second end segment 26–40 that extends from one axial side of this body 14; the second segments 26–40 of the inputs E1 to E12 are located on the same axial side of the body 14 of the stator 13 and are electrically connected to form a neutral point 53.

Each input E1 to E12 also includes a third segment 45 connecting the first and second segments, and a fourth segment 46 that extends the first segment 25 from the side opposite the third segment 45. This fourth segment 46 projects from the axial side of the body 14 of the stator 13 opposite the neutral point 53 and is welded to an electrically conducting element 50 of the phase associated with said input.

According to the invention, inputs E1 to E12 are twisted, with at least one flat surface 21–24 of each input, and generally both, extending along the first segment 25 in a radial plane and extending along the second end segment 26–40, either to form a coaxial cylinder portion in the body 14 of stator 13, or in a plane at a tangent to a coaxial cylinder in the body 14 of stator 13.

In the first case, the second segments are circumferential in orientation. In the second case, the second segments are axial in orientation.

The second segments 26–40 of the inputs E1 to E12 are, in both cases, located at an axial end of the first or second chignon 12 or 12'. In the design methods shown on FIGS. 2 to 14, these second segments 21 to 24 extend more specifically along the circle drawn by the tops 521 of the arched heads 52.

The orientation of the flat surfaces 21 to 24 is changed progressively along the third segment 45 of each input, which connects the first segment 25 to the second segment.

In the first design mode for the invention, shown on FIGS. 2 to 7, at least two of the second segments 26 of inputs E1 to E3 are identical.

In a first design variant shown on FIGS. 2a to 2c, the second segments 26 of the three inputs E1 to E3 have a circumferential orientation and extend in the same direction, which is clockwise on FIG. 2a. The second segments 26 of inputs E1 and E2 have the same circumference length, greater than the length of the second segment 26 of input E3.

Input E2 is arranged between inputs E1 and E3 following the circumference of the body 14, and inputs E1 and E2 are separated by the same angular offset as inputs E2 and E3.

The second segment of input E1 is located slightly more to the outside of the body 14 than the second segment of input E2, which is itself located slightly more to the outside of the body 14 than the second segment of input E3.

If we call the parts of the second segment 26, located relatively close to the third segment 45 and opposite the segment, the anterior part and the end part 261 and 262, we will see on FIG. 2a that the end part 262 of the second segment 26 of input E1 is plated along the anterior part 261 of the second segment 26 of input E2. Likewise, the end part 262 of the second segment 26 of input E2 is plated along the anterior part 261 of the second segment 26 of input E3. The second segments of inputs E1 and E3 do not join.

The second segments of inputs E1 to E3 are plates on each other through their relatively wide flat surfaces 21.

The second segment 26 of input E1 is welded through a free end 263 on the second segment 26 of input E2 at a relatively central point of the segment.

The second segment 26 of input E2 is welded through its free end 263 onto the free end 263 of the second segment 26 of input E3.

Thus, the second segment 26 of input E3 does not extend in the clockwise direction beyond the weld point with input E2.

In a second variant, the second segment 26 of input E3 extends in the clockwise direction beyond the weld point with input E2 as shown on FIG. 3.

In a third design variant, shown on FIG. 3, the second segment 26 of input E2 extends beyond the weld point with input E2 also through an axial segment 56 of the side opposite the third segment 45; this axial segment 56 extends in a direction opposite the body 14 of the stator 13. In these three variants, three inputs and two welds are used. In a variant, three welds and an additional neutral bar are used to reduce the circumference length of the inputs.

Figure 4B:
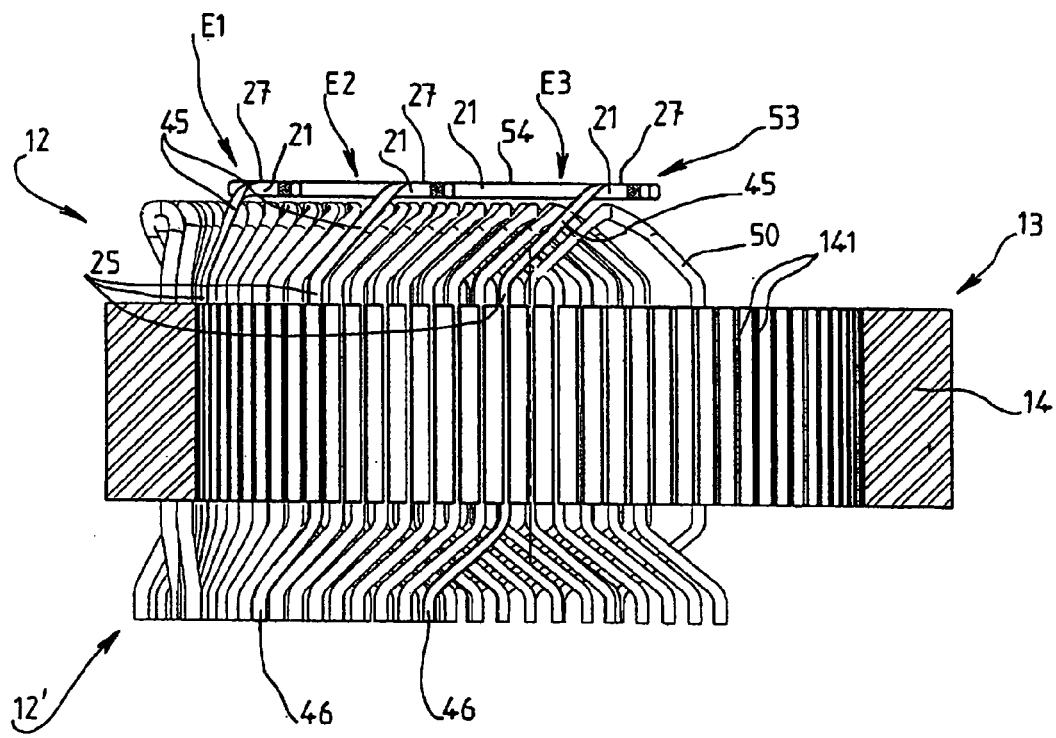
FIGS. 4*a* and 4*b* are views similar to views 2*a* and 2*b*, for another variant of the first mode for fabricating the invention.
Figure 4A:
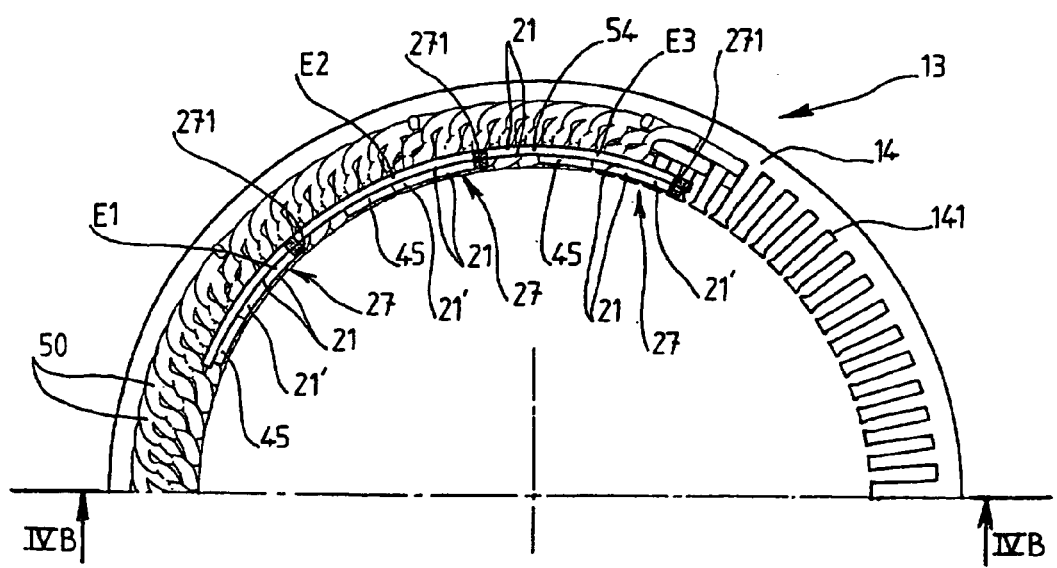

Thus, in a fourth design variant, shown on FIGS. 4a and 4b, the second segments 27 of inputs E1 to E3 are electrically connected by a neutral bar 54 with a circumferential orientation; the second segments 27 of the inputs are attached to this neutral bar through their respective flat surfaces 21.

This neutral bar 54 has a rectangular section identical to the section of inputs E1 to E3 and thus also includes two opposite flat surfaces 21.

The neutral bar 54 is arranged so that its flat surfaces 21 form coaxial cylinder portions in the body 14.

The second segments 27 of inputs E1 to E3 also have a circumferential orientation, and their respective flat surfaces 21 form coaxial cylinder portions in the body of the stator; the second segments 27 of the three inputs E1 to E3 are plated along the flat surface 21 of the most radially interior neutral bar 54.

These second segments 27 are welded by free ends 271 on the neutral bar 54.

The second segments 27 of inputs E1 to E3 are here the same circumference length and are, therefore, identical. This is also true in FIGS. 4 to 7.

The second segments 27 are arranged so that they extend from each other, parallel to the neutral bar 54, but do not touch. The neutral bar 54 practically does not exceed each side of the three aligned second segments 27.

Inputs E1, E2 and E3 are spaced regularly around the axis of the body 14. In a variant, at least one of the second segments 27 is a different circumference length.

A fifth design variant is shown on FIG. 5. It is identical to the fourth design variant in all points, with the exception of the neutral bar 54, which extends to one of its ends 541 through a segment with an axial orientation 56 that extends in a direction opposite the body 14 of the stator 13.

Figure 6B:
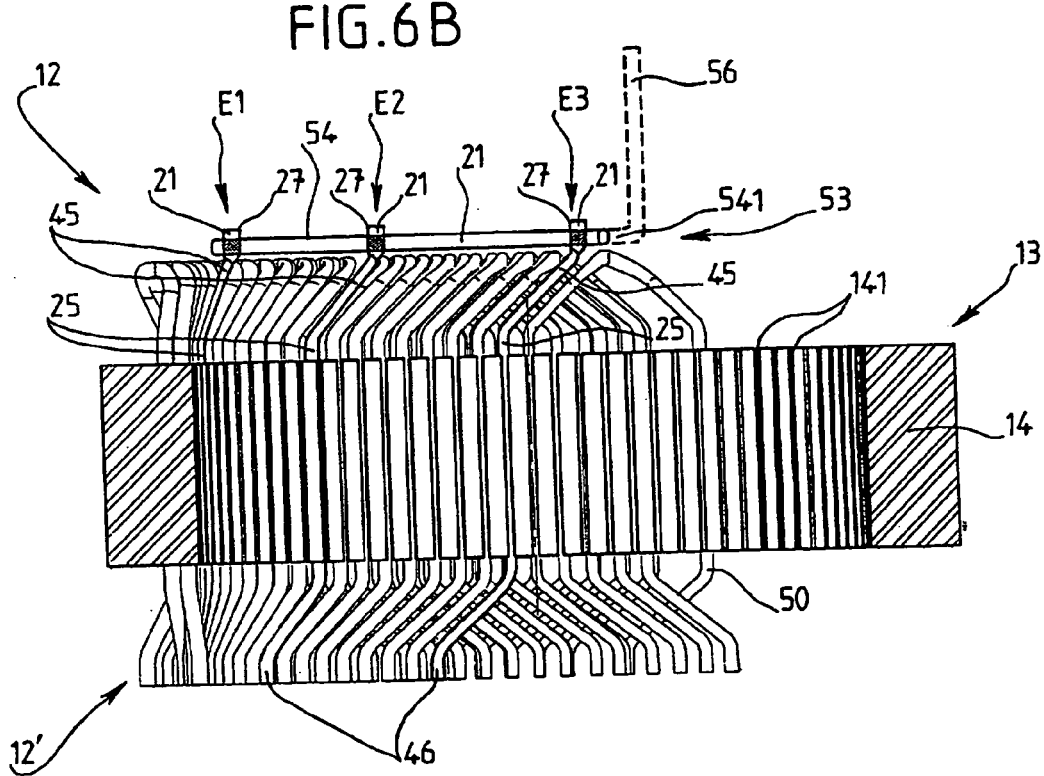
FIGS. 6*a* and 6*b* are views similar to views 2*a* and 2*b*, for another variant of the first method of making the invention.
Figure 6A:
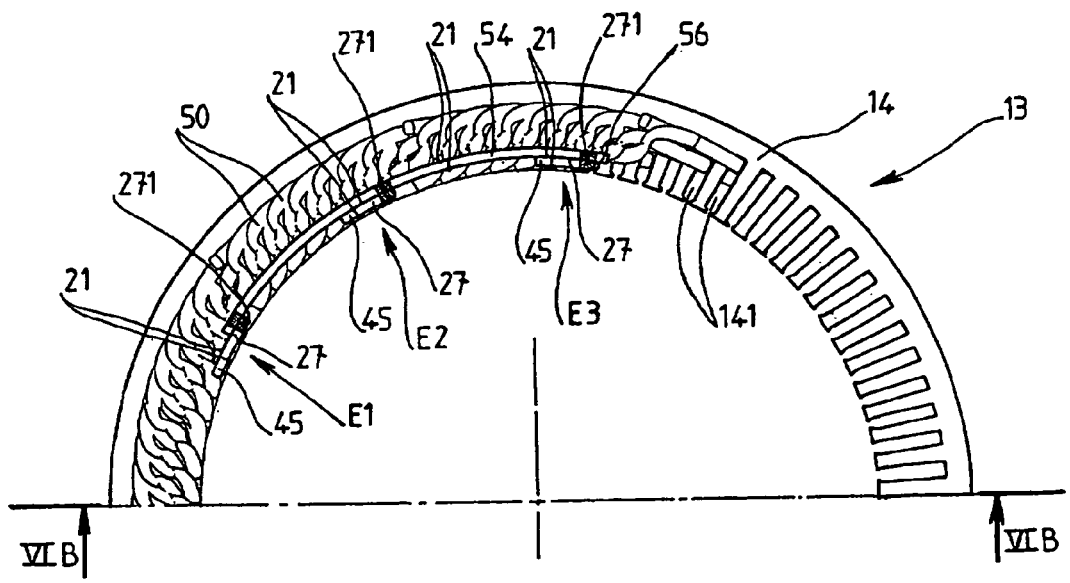

A sixth design variant is shown on FIGS. 6a and 6b. It is identical to the fifth design variant with the exception of the fact that the second segments 27 of inputs E1 to E3 extend in an axial direction and not in a circumferential direction, and their respective flat surfaces 21 extend in planes tangent to the neutral bar 54. Thus, the circumferential lengths of the inputs are reduced.

The second segments 27 of inputs E1 to E3 can be attached by their respective flat surfaces onto the flat surface 21 of the neutral bar 54 located radially farthest inside the body 14, as in FIG. 6a, or farthest to the outside of the body 14 as in FIG. 7.

Thus, this first design method is particularly simple, since the three inputs are of the same type because they extend in the same circumferential direction, and at least two are identical, except in the variants where one of the inputs extends through an axial segment. Thus, it is possible to limit the number of different parts used, which is practical and economical.

A second design method for the invention is shown on FIGS. 8 and 9. In this method, two welds are used along with a first input with a very large circumference. Thus, a first input E4 includes a relatively long second segment 28 with a circumferential orientation; two other inputs E5 and E6 have two second segments 29 with the same length, which is shorter than the length of the second segment 28 of the first input E4.

The two flat surfaces 22 of the second segment 28 of the first input E4 form portions of coaxial cylinders in the body 14 of the stator 13; the second segments 29 of the other two inputs E5 and E6 are attached through their flat surfaces 22 on one of the two flat surfaces 22 of the second segment 28 of the first input E4.

The other inputs E5 and E6 are arranged on the same side of the first input E4, along the circumference of the body 14 and the second segment 28 of the first input E4 extends in the direction of these inputs E5 and E6.

Figure 8B:
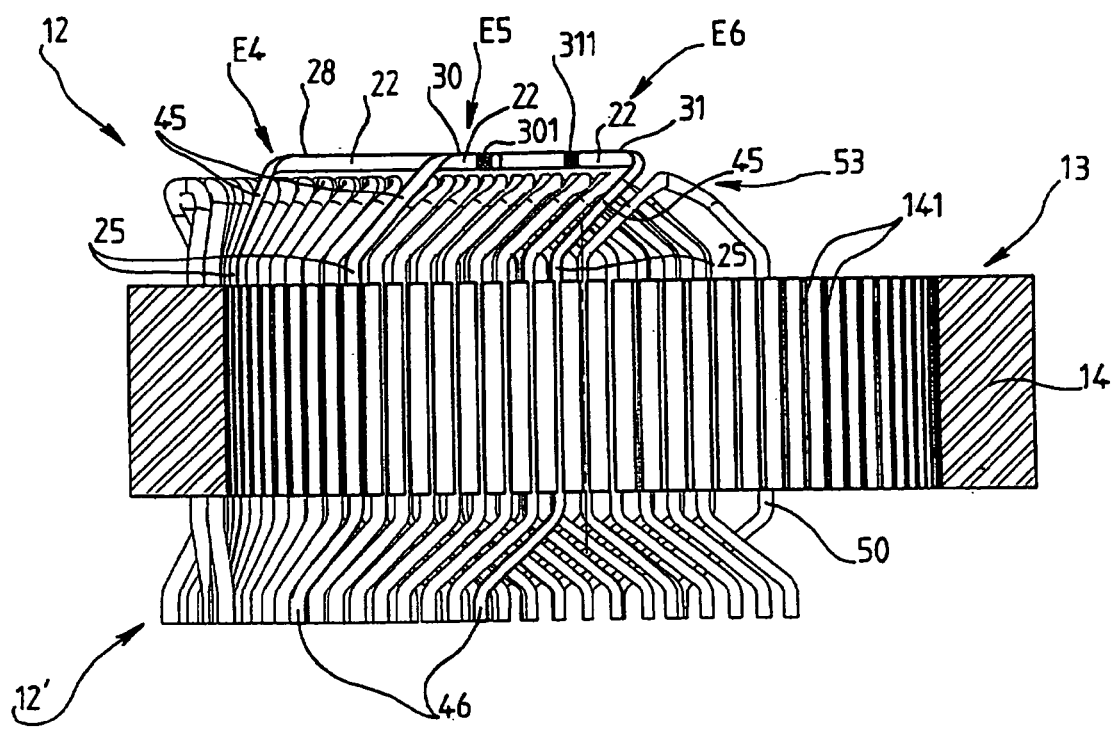
FIGS. 8*a* and 8*b* are views similar to views 2*a* and 2*b* for a second method of making the invention
Figure 8A:
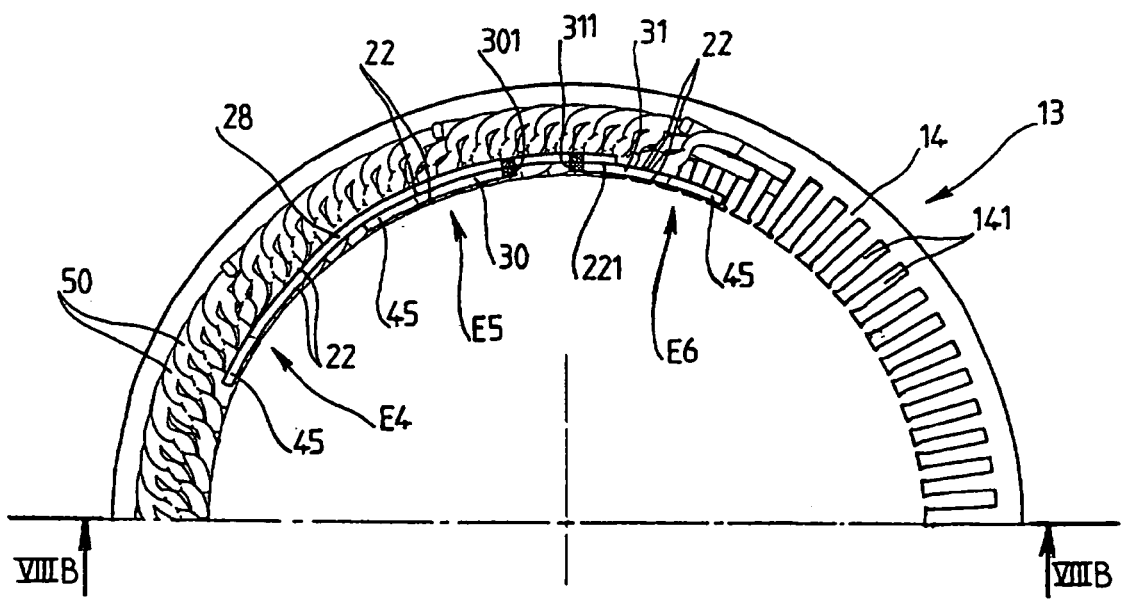

In the first design variant shown on FIGS. 8a and 8b, the second segments 30 and 31 of the other two inputs E5 and E6 are circumferential in orientation and extend in opposite directions—clockwise for one and counterclockwise for the other following the circumference of the body 14 of the stator 13.

The respective flat surfaces 22 of the second segments 30 and 31 of the other two inputs E5 and E6 form coaxial cylinder portions in the body 14 of the stator 13. These flat surfaces 22 extend parallel to one of the two flat surfaces 22 of the second segment 28 of the first input E4 over the entire length, or at least through an end part 221, and are plated against said flat surface 22 of the second segment 28.

The second segments 30 and 31 of the other two inputs E5 and E6 are welded through the free ends 301 and 311 to the second segment 28 of the first input E4.

One variant, which is not shown, is identical to the first, with the exception of the fact that the second segments 30 and 31 belonging respectively to inputs E5 and E6 extend in the same direction. This direction may be identical to the direction in which the second segment 28 of the first input E4 extends, or in the opposite direction. Their respective flat surfaces 22 form coaxial cylinder portions in this body 14.

A third variant is identical to the first or the second variant, but the second segment 28 of the first input E4 extends through an axial segment 56 that extends in a direction opposite the body 14 from the end of the second segment 28 opposite the third segment 45. It is shown on FIG. 9.

Of course, it is possible to reduce the number of welds and simplify the inputs.

Thus, in a third design of the invention, shown on FIGS. 10 and 11, two of the inputs E7 and E8 are united through their second segments 32 and 33 to form the two branches of a pin 55.

These second segments 32 and 33 are circumferential in orientation and extend in opposite directions—one clockwise and the other counterclockwise-following the circumference of the body 14. Their respective flat surfaces 23 are arranged so that they extend from each other. These flat surfaces 23 together form a continuous portion of coaxial cable in the body 14 of the stator 13 so that the inputs E7 and E8 are simplified.

A third input E9 is attached through the flat surface 23 of its second segment 34/35 to said cylinder portion formed by the flat sides 23 of the second segments 32 and 33 of inputs E7 and E8.

Figure 10B:
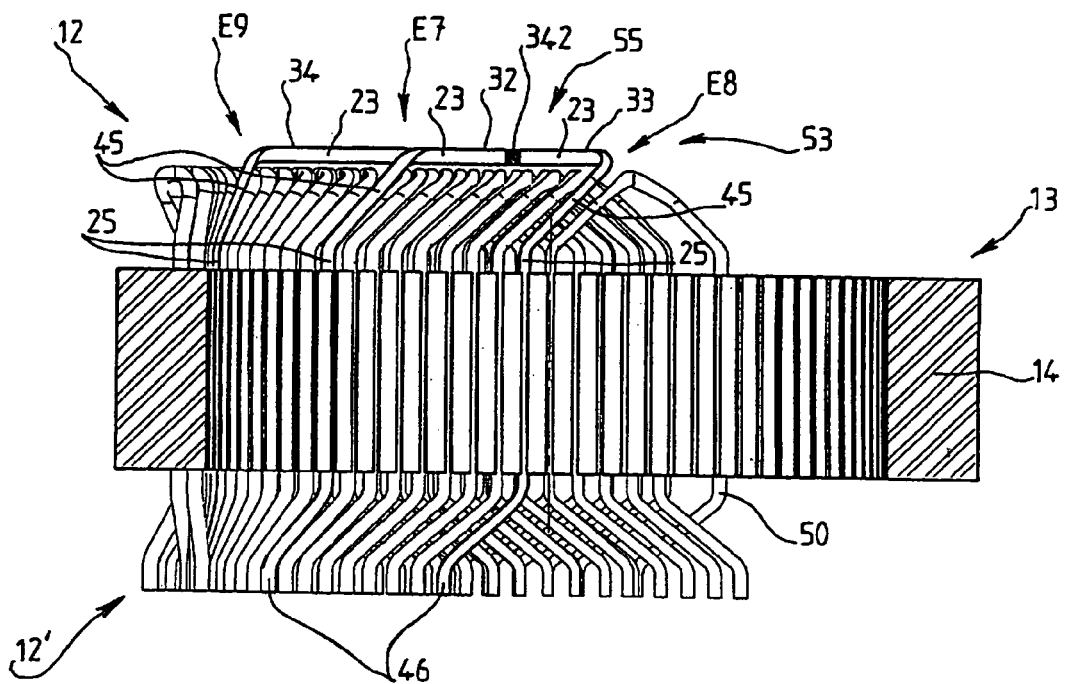
FIGS. 10*a* and 10*b* are views similar to 2*a* and 2*b*, for a third method for designing the invention.
Figure 10A:
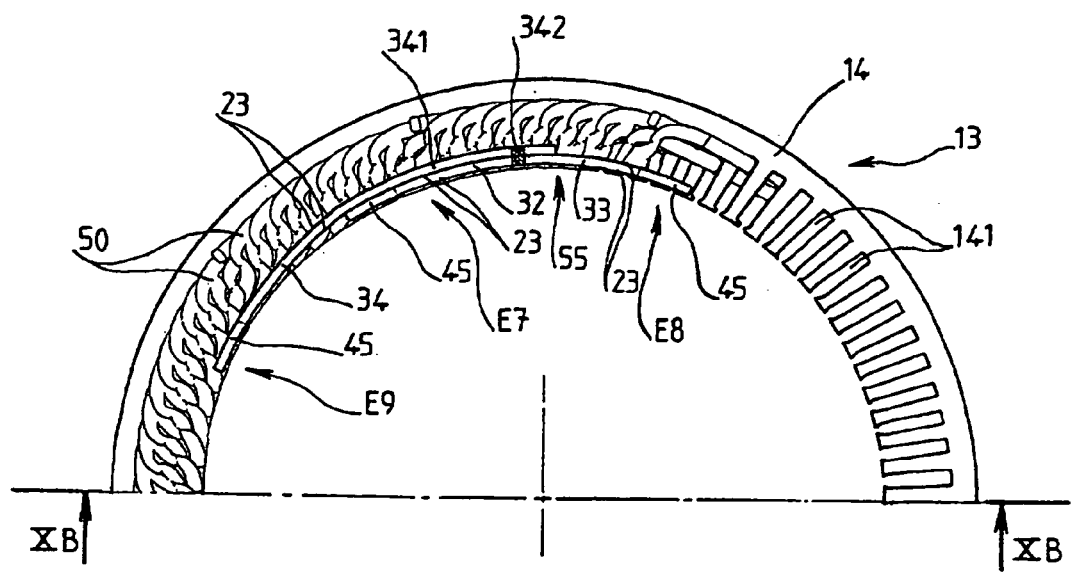

In a first design variant, shown on FIGS. 10a and 10b, inputs E7 to E9 are located at different angle positions around the axis of the body 14 of the rotor 13, and the two inputs E7 and E8 combined in a pin are consecutive and follow the circumference of the body of the stator. Here, input E9 has a longer circumference length than that of inputs E7, E8 combined.

The second segment 34 of the third input E9 is circumferential in orientation and its opposite flat surfaces 23 form portions of coaxial cylinders in the body 14 of the stator 13.

This second segment 34 includes an end part 341 that extends in parallel to the united second segments 32 and 33 of inputs E7 and E8, and is attached by one of the two flat surfaces 23 onto one of the two opposite flat surfaces 23 of the combined second segments 32 and 33.

The end part 341 of the second segment 34 is welded at one point onto the combined second segments 32 and 33, for example through a free end 342.

Figure 11B:
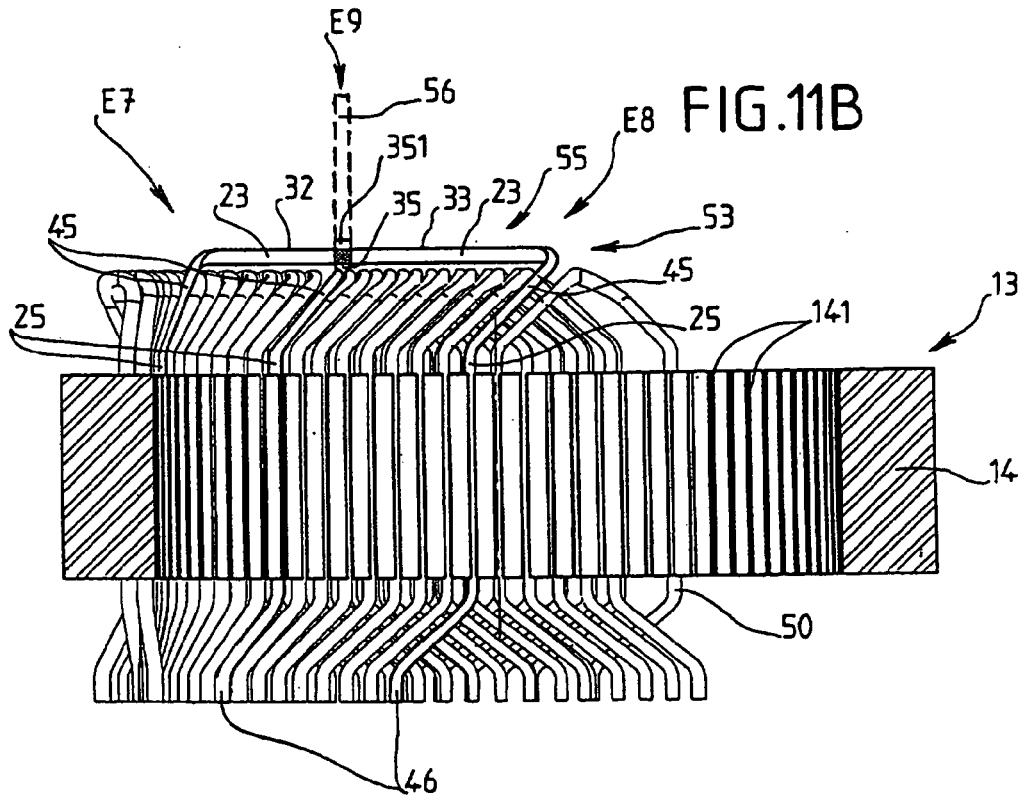
FIGS. 11*a* and 11*b* are views similar to views 10*a* and 10*b*, for a variant of the third method for fabricating the invention.
Figure 11A:
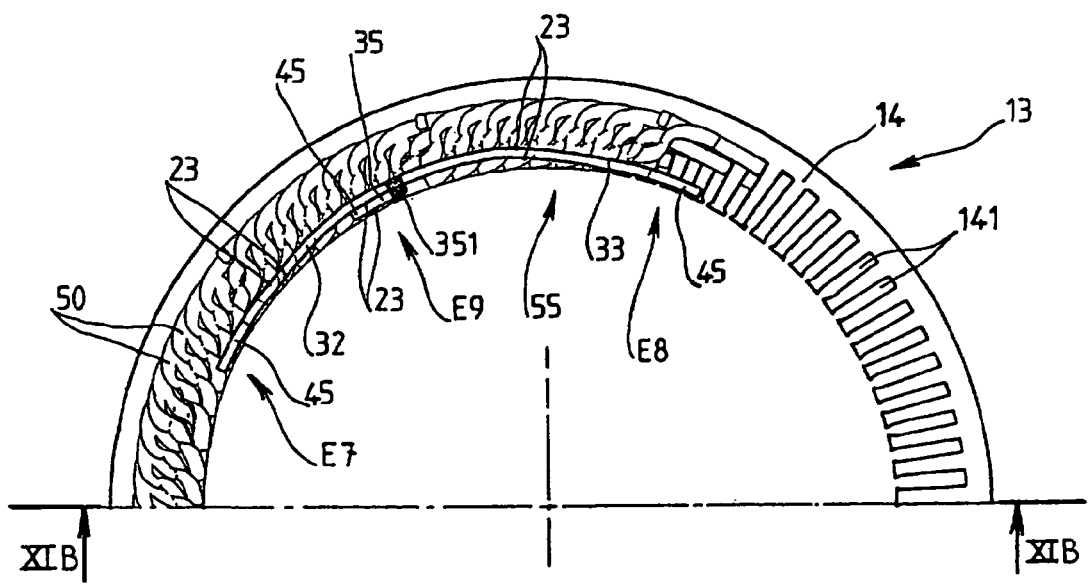

A second design variant is shown on FIGS. 11a and 11b. It is identical to the first variant, with the exception of the following points.

We see first that the two inputs E7 and E8 combined in a pin are not consecutive following the circumference of the body 14 of the stator 13. The third input E9 is set between inputs E7 and E8.

We also note that the second segment 35 of the third input E9 extends in an axial direction, with one of its opposite flat sides 23 extending into a plane at a tangent with the combined second segments 32 and 33 of the two inputs E7 and E 8 forming a pin.

This second segment 35 is welded at one point on the combined second segments 32 and 33, for example through a free end 351.

A third variant is identical to the first or second variant, but the second segment 34/35 of the third input E9 extends through an axial segment 56 that extends in a direction opposite the body 14 from the end of the second segment 34/35 opposite the third segment 45.

It should be noted that the characteristics of the first and second variants can be combined without moving away from the invention. Thus, one can combine the consecutive inputs E7 and E8 with a third input E9, the second segment of which has an axial orientation. Likewise, one can combine non-consecutive inputs E7 and E8 with a third input E9, the second segment of which has a circumference orientation.

In a fourth design method for the invention shown on FIGS. 12 to 14, the second segments 36 to 40 of inputs E10 to E12 are oriented toward the circumference and all extend in parallel over at least a portion of their length. In this design, there is only one welding points for the three inputs.

Figure 12B:
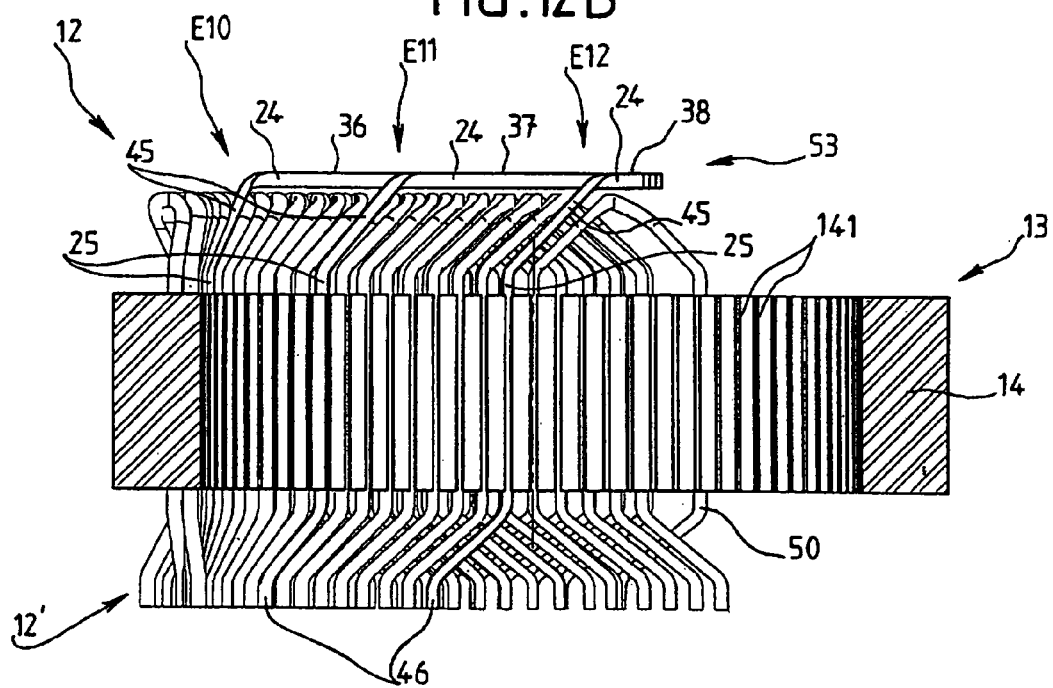
Figure 12A:
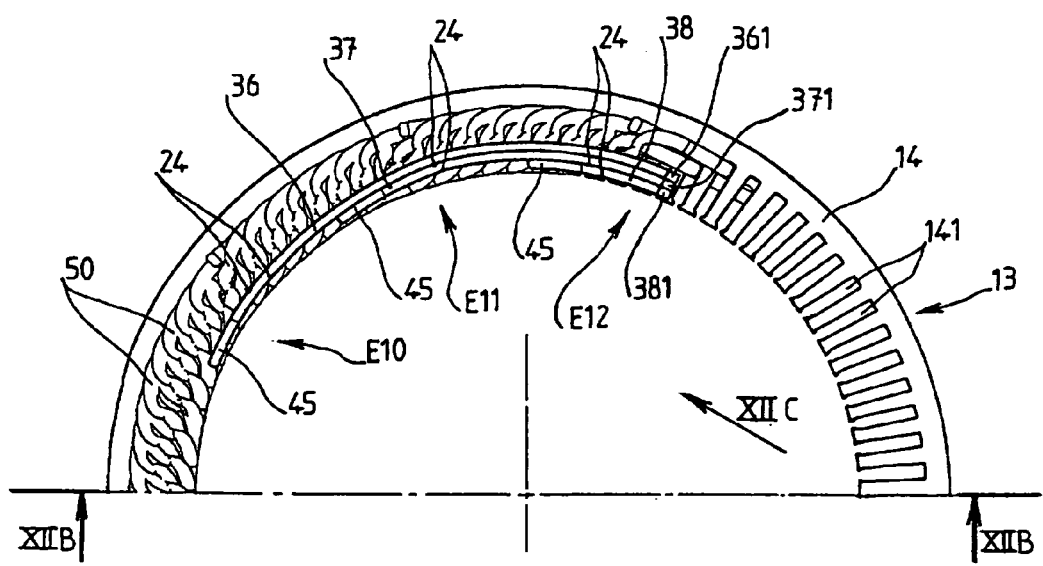

In a first design variant shown on FIGS. 12a, 12b and 12c, the second segments 36 to 38, which belong respectively to inputs E10 to E12, all extend in the same direction, for example clockwise following the circumference of the body 14 of the stator 13 shown on FIG. 12a.

Inputs E10 to E12 are located at different angles around the axis of the body 14. E10 precedes E11, which precedes E12 following the circumference of the body 14 on FIG. 12a in a clockwise direction.

The length of the second segment 36 is greater than the length of the second segment 37, which is greater than the length of the second segment 38; the respective free ends 361, 371 and 381 of these three segments arrive at the same point.

The respective flat surfaces 24 of second segments 36 to 38 form coaxial cylinder portions in the body 14 of the stator 13.

The second segment 38 of input E12 is attached over its entire length, through one of its flat surfaces 24, onto one of the flat surfaces 24 of the second segment 37 of input E11.

Likewise, the second segment 37 of input E11 is attached over its entire length, through its flat surface 24 opposite second segment 38, onto one of the flat surfaces 24 of second segment 36 of input E10.

The free ends 361 to 381 of second segments 36 to 38 are welded together.

In a second design variant, shown on FIGS. 14a and 14b, the respective second segments of at least two of the inputs E10 to E12 extend in opposite directions, for example clockwise for the second segments 36 and 39 of inputs E10 and E11 and counterclockwise for second segment 40 of input E12, following the circumference of the body 14 shown on FIG. 14a.

Inputs E10 to E12 are located at different angles around the axis of the body 14, with E10 preceding E11, which precedes E12 following the circumference of the body 14 on FIG. 14a.

The length of the second segment 36 of input E10 is greater than the length of the second segment 39 of input E11. The respective free ends 361, 391 and 401 of the three segments 36, 39 and 40 arrive at the same point.

The respective flat surfaces 24 of second segments 36, 39 and 40 form coaxial cylinder portions in the body 14 of the stator 13.

The second segment 39 of input E11 is attached over its entire length, through one of its flat surfaces 24, onto one of the flat surfaces 24 of the second segment 36 of input E10.

In contrast, the second segment 40 of input E12 is only attached, through the surface 24 of its free end 401, onto the flat surface 24 of the second segment 36 of input E10 opposite the second segment 39.

The free ends 361, 391 and 401 of second segments 36, 39 and 40 are welded together.

A third design variant is identical in all points to the first and second design variants, with the exception of the fact that the second segment 36 of input E10 extends through an axial segment 56 that continues in a direction opposite from the body 14 from the end of the second segment 36 opposite the third segment 45. An example of this third variant is shown on FIG. 13.

We see, therefore, that the different design methods of the invention described above allow easy welding of the second segments of the three inputs to each other; the welding head is positioned radially in relation to the body of the stator. In effect, the flat surfaces, which are relatively wide here, i.e. the flats, of the second segments always extend in planes perpendicular to a radial direction in relation to the cylindrical body of the stator.

The invention has been described in an application to a triphased stator, but can be applied to a stator with six phases or more.

The inputs can have non-rectangular sections, provided that each input has at least one flat longitudinal surface.

We will note that the neutral point is formed by completing a small number of welds, from 1 to 3 depending on the design methods and variants.

In the illustrated figures, in reality, four conducting elements are provided through axial notches 141 and two series of triphased windings offset by an electric angle of 30° as shown, for example, in FIGS. 3 and 4 of document FR-A-2 819 117 filed on Oct. 19, 2001. The heads of the pins connect the axial branches as, for example, in FIGS. 7, 15 and 16 of this document which can be consulted for more details. In the notches, the leads of the first segments 25 are in contact through their relatively wide flat surfaces with the generally radial edges of the notches. In a variant, the notches 141 are angled so that, in all cases, the flat surface of each input extends along the first segment into a generally radial plane. In variants, no notches are provided as described, for example, in document U.S. Pat. No. 5,097,167 which can be consulted for more details. Thus, insulating plates and resin elements are provided at the ends of the chignons. The first segments 25 cross the body of the stator in all cases.

What is claimed is:

1. An alternator, comprising:
   a rotor;
   a stator comprising a cylindrical body with a plurality of phases, wherein each of the plurality of phases comprises:
      a phase input located at least partially outside of the cylindrical body, wherein the phase input is formed from a bar, the bar comprising:
         a longitudinal surface extending along at least a part of the bar, said longitudinal surface being formed between two consecutive longitudinal edges of the bar,
         a first segment crossing the cylindrical body, and
         a second segment extending from an axial side of the cylindrical body; and
      a phase output located at least partially outside of the cylindrical body; and
   conducting elements crossing the cylindrical body and forming at two axially opposite sides of the body, respectively, a first chignon and a second chignon, wherein the conducting elements are electrically connected to form at least one winding connecting the phase input to the phase output;
   wherein the second segments of the phase inputs are located on a same axial side of the cylindrical body and are electrically connected to form a neutral point; and
   wherein each phase input is twisted, with the longitudinal surface extending along the first segment in a generally radial plane and extending along the second segment forming one of a plane tangential to a cylindrical portion coaxial to the cylindrical body and a cylindrical portion coaxial to the cylindrical body.

2. The alternator of claim 1, wherein the second segments of the phase inputs are identical.

3. The alternator of claim 2, wherein the second segments of the phase inputs are electrically connected through a neutral bar having a circumferential orientation, each second segment being attached to the neutral bar through the longitudinal surface.

4. The alternator of claim 3, wherein the second segment of the phase input has a circumferential orientation, the longitudinal surface forming a coaxial cylindrical portion in the cylindrical body of the stator.

5. The alternator of claim 3, wherein the second segment extends in an axial direction, the longitudinal surface extending in a plane tangent to the neutral bar.

6. The alternator of claim 1, wherein the second segment of a first phase input has a circumferential orientation and the second segments of two other phase inputs have a same length shorter than the second segment of the first phase input, wherein the longitudinal surface of the second segment of the first phase input forms a coaxial cylindrical portion in the cylindrical body of the stator and the second segments of the two other phase inputs are attached through their respective longitudinal surfaces onto the longitudinal surface of the first phase input.

7. The alternator of claim 6, wherein the second segments of the two other phase inputs have a circumferential orientation and extend in a same direction, wherein their respective longitudinal surfaces form coaxial cylindrical portions in the cylindrical body of the stator.

8. The alternator of claim 6, wherein the second segments of the two other phase inputs have a circumferential orientation and extend in opposing directions, one of the second segments in a clockwise direction and the other in a counterclockwise direction, wherein their respective longitudinal surfaces form coaxial cylindrical portions in the cylindrical body of the stator.

9. The alternator of claim 1, wherein two phase inputs are combined through their respective second segments to form two branches of a pin, their respective second segments having a circumferential orientation and their respective longitudinal surfaces arranged in an extension of each other forming a coaxial cylindrical portion of the cylindrical body of the stator, wherein a third phase input is attached through its longitudinal surface to the coaxial cylindrical portion formed by the two phase inputs.

10. The alternator of claim 9, wherein the two phase inputs and the third phase input are located at different angles around an axis of the cylindrical body of the stator, wherein the two phase inputs are combined into a pin and are consecutive along a circumference of the cylindrical body.

11. The alternator of claim 9, wherein the two phase inputs and the third phase input are located at different angles around an axis of the cylindrical body of the stator, wherein the two phase inputs are combined into a pin and are not consecutive along a circumference of the cylindrical body.

12. The alternator of claim 9, wherein the second segment of the third phase input has a circumferential orientation and the longitudinal surface forms a coaxial cylindrical portion in the cylindrical body of the stator.

13. The alternator of claim 9, wherein the second segment of the third input extends in an axial direction and the longitudinal surface extends into a plane tangent to the combined second segments of the two phase inputs to form a pin.

14. The alternator of claim 1, wherein the second segment of the phase input has a circumferential orientation and extends in parallel over at least one part of its length with the second segment of each phase input.

15. The alternator of claim 14, wherein the second segment of each phase input extends in a same direction.

16. The alternator of claim 14, wherein the second segment of at least two phase inputs extend in opposing directions, one of the second segments in a clockwise direction and the other in a counterclockwise direction.

17. The alternator of claim 1, wherein at least one phase input comprises an axial segment extending the second segment in a direction opposite the cylindrical body of the stator.

18. The alternator of claim 1, wherein the second segment of the phase input is located at an axial end of one of the first chignon and the second chignon.

* * * * *